Dec. 31, 1935.   G. RUCK   2,025,904

GLAND FOR OZONE GENERATORS AND THE LIKE

Filed April 6, 1934   2 Sheets-Sheet 1

Inventor:—
George Ruck
by his Attorneys,
Howson & Howson

Dec. 31, 1935.   G. RUCK   2,025,904
GLAND FOR OZONE GENERATORS AND THE LIKE
Filed April 6, 1934   2 Sheets-Sheet 2

Inventor:—
George Ruck
by his Attorneys
Howson & Howson

Patented Dec. 31, 1935

2,025,904

UNITED STATES PATENT OFFICE 2,025,904

GLAND FOR OZONE GENERATORS
AND THE LIKE

George Ruck, Philadelphia, Pa.

Application April 6, 1934, Serial No. 719,394

2 Claims. (Cl. 285—30)

This invention relates to new and useful improvements in ozone generators and more particularly to novel gland devices therefor.

An object of the invention is to provide an ozone generator of the character set forth having a novel gland or gasket associated therewith for sealing the oxygen and the electrodes from the cooling water for the electrodes.

Certain other objects and features of the invention and the details of construction thereof are set forth hereinafter and shown in the accompanying drawings, in which Fig. 1 is an enlarged view in section longitudinally through the ozone generator.

Figure 1:
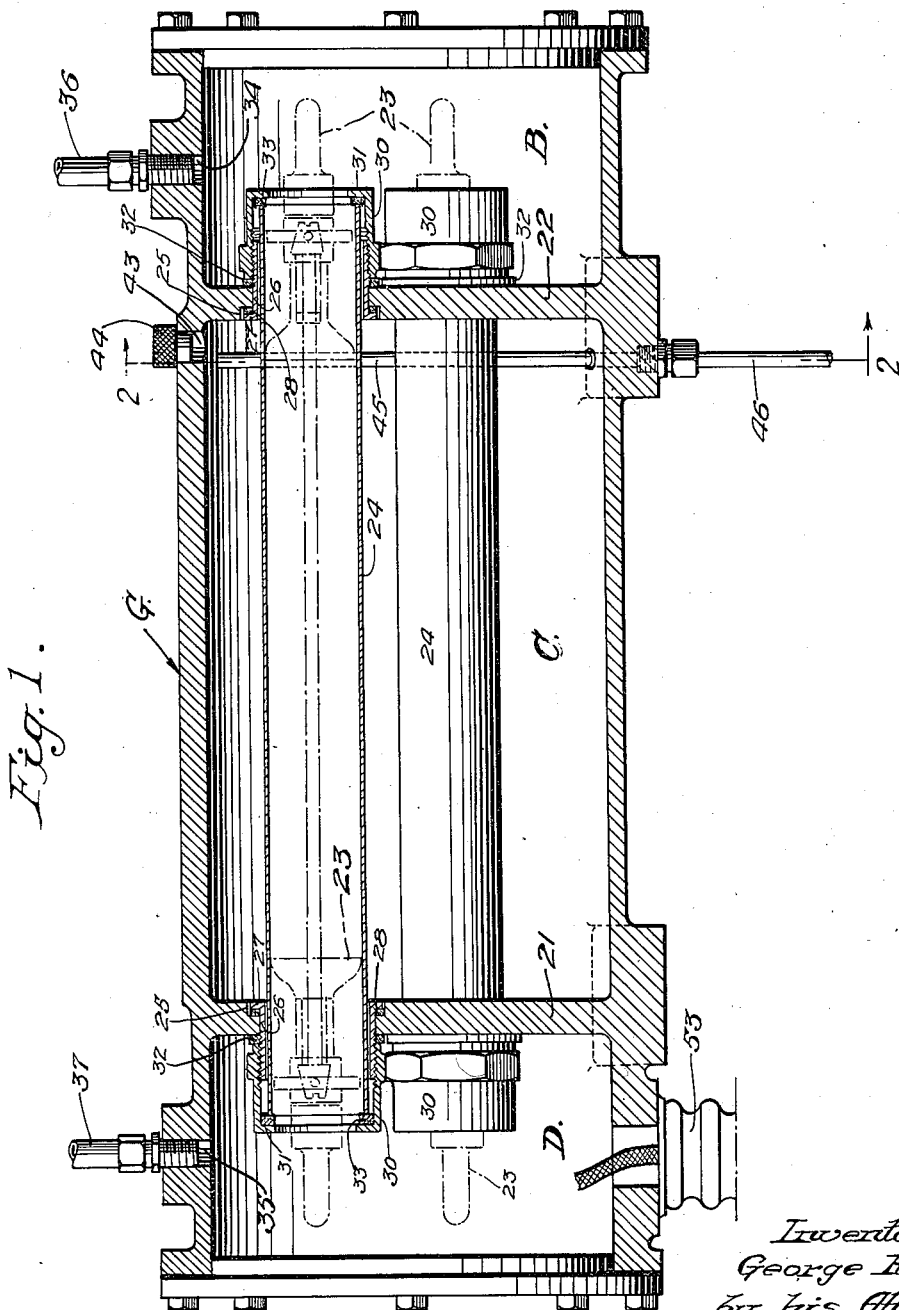

A generator G in the form of a cylindrical tank is shown in Fig. 1 and this generator G is subdivided into three compartments B, C and D respectively by means of partitions 21 and 22, which are equally spaced from the adjacent end of the said generator tank. The partitions 21 and 22 are provided with a plurality of similarly disposed aligned apertures therein for the purpose of supporting a like number of electrodes longitudinally within the generator in equally spaced relation with respect to one another. The electrodes 23 are preferably of duraluminum and are each mounted in tubular elements 24 composed of glass or other known material non-conductive of electricity. These tubes are open at their ends and as shown free passage therethrough between compartments B and D is effected, the electrodes being supported in the glass tubes 24 and in spaced relation from the wall surface thereof in any suitable manner that may be found desirable.

A particular feature of the invention resides in the novel construction of the gland in which the ends of the electrode tubes 24 are supported in the apertures of the partitions 21 and 22 for the purpose of effectively sealing the compartments B and D from any possible communication of either of them with the central compartment C.

Figure 3:
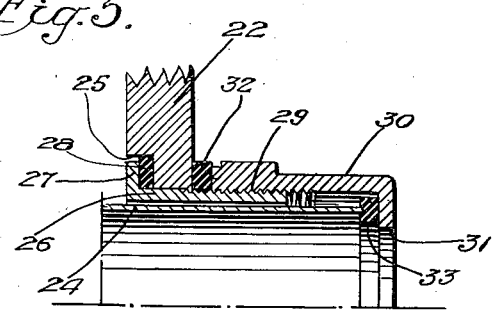
Fig. 3 is an enlarged fragmentary view in section showing the novel gland construction for sealing the glass electrode tubes within the generator.

With reference to Fig. 3 of the drawings it will be noticed that the adjacent surfaces of the partitions 21 and 22 are counter-sunk as at 25 and a sleeve 26 having a radial flange 27 extends between each of the glass tubes 24 and the adjacent wall surface of the said partitions 21 and 22. A washer or gasket 28 is disposed between the adjacent faces of the radial flange 27 and the partitions 21 and 22. The outer surface of the sleeve 26 is threaded as at 29 and is arranged to receive a sleeve 30 having a radially inward flange 31. A washer or gasket 32 is disposed between the other end of the sleeve 30 and the adjacent surface of the partitions 21 and 22 and a similar gasket 33 is disposed intermediate the adjacent end of the glass tube 24 and the proximate surface of the radial inward flange 31 of the sleeve 30.

In this manner it will be noted that by rotating the sleeve 30 to tighten the same upon the threaded sleeve 26, said sleeves will move in respectively opposite directions and the flange 27 will tighten against and compress the washer 28 against the partition 21 or 22 and the flange 31 and the other end of the sleeve 30 will engage the washers or gaskets 32 and 33 respectively to compress the same respectively against the partitions 21 or 22 and the end of the glass tube 24, thus sealing the end compartments B and D as well as the interiors of the tubes 24 from the interior of the central compartment C.

The particular form of gland just previously described exerts no radial force upon the glass tubes 24 but rather longitudinally thereof. In this manner it has been found that the breakage of electrode tubes 24 in a device of the present character has been practically eliminated, whereas in other devices of this similar nature, one glaring fault and difficulty constantly present was the frequent necessity of replacing broken tubes as a result of the use of glands for mounting the same in partitions in which the sealing or tightening force effected by the gland was exerted against the peripheral surface of the tubes rather than longitudinally thereof as in the present instance.

The compartments B and D are provided with inlet and outlet ports respectively 34 and 35, to which are connected pipes or tubes 36 and 37.

Figure 2:
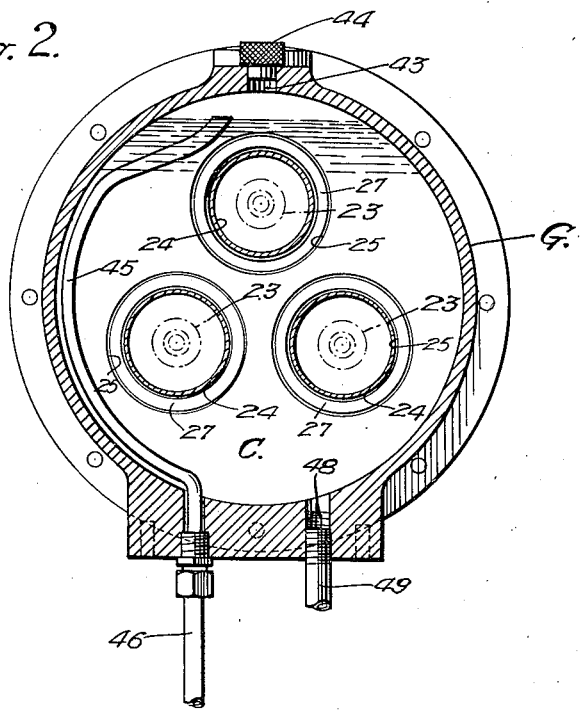
Fig. 2 is a view in section on line 2, 2, Fig. 1.

For the purpose of maintaining the electrodes 23 substantially cool, the compartment C is provided with a port 43 in the top thereof to permit the said compartment to be filled with water to a height at least above the uppermost tube 24 surrounding the said electrodes, as shown in Fig. 2 of the drawings, the said port 43 being provided with a plug stop 44 to effectually close the same. An overflow tube or pipe 45 extends from adjacent the top of the compartment C outwardly of the bottom thereof and is connected to a drain pipe 46. The central compartment C is also provided with a drain port 48 which connects with a pipe 49.

While a specific embodiment of the invention has been set forth for the purpose of description, it is not intended that the same should be limited thereto, or that limitations and modifications may not be made within the spirit of the invention and the scope of the annexed claims.

What I claim is:

1. The combination with a wall structure having an aperture therein, of tubular means mounted in said aperture and extending through the wall structure, and means for sealing the tubular means in said partitions to prevent communication from one side thereof to the other, said means including a sleeve having a radial flange, a second sleeve threaded on said first sleeve and having an inward flange arranged to overlie the end of said tubular means, and packing means adjacent said first flange and the adjacent wall of the wall structure, and the flange on the second sleeve and the adjacent end of the tube whereby communication from one side of the said wall structure to the other is precluded.

2. The combination with a wall structure having an aperture therein, a sleeve extending through said aperture, a radial flange at one end of the sleeve overlying the adjacent surface of said wall structure, a pipe or tube extending through said sleeve, a second sleeve threaded on the first mentioned sleeve at the opposite end thereof from its flange, an inwardly projecting flange on the end of the second sleeve arranged to overlie the end of the pipe or tube, and packing means intermediate the flange of the first sleeve and the adjacent face of the wall structure, the other face of the wall structure and the end of the second sleeve, and intermediate the end of the pipe or tube and the flange of the second sleeve, whereby a sealed joint is provided between the end of said pipe or tube at one side of the wall and the opposite side thereof when the second sleeve is threaded on to the first sleeve to compress the said compressible means.

GEORGE RUCK.